United States Patent [19]

Ames

[11] Patent Number: 4,831,291
[45] Date of Patent: May 16, 1989

[54] DIFFERENTIALLY WOUND ELECTROMAGNETIC ACTUATOR

[75] Inventor: Gregory H. Ames, Colorado Springs, Colo.

[73] Assignee: Kaman Instrumentation Corporation, Colorado Springs, Colo.

[21] Appl. No.: 114,550

[22] Filed: Oct. 28, 1987

[51] Int. Cl.$^4$ .................. H02K 41/00; H02K 1/06
[52] U.S. Cl. ..................... 310/13; 310/90.5; 310/154; 350/611
[58] Field of Search ............. 250/201, 231 R; 310/12, 310/13, 14, 15, 80, 90.5, 154; 335/256, 258, 268, 281; 350/607, 609, 611, 637

[56] References Cited

U.S. PATENT DOCUMENTS

| | | | |
|---|---|---|---|
| 4,227,100 | 10/1980 | Ezekiel et al. | 310/13 |
| 4,318,038 | 3/1982 | Munehiro | 310/13 |
| 4,439,700 | 3/1984 | Menzel et al. | 310/13 |
| 4,494,022 | 1/1985 | Kawara et al. | 310/13 |
| 4,631,430 | 12/1986 | Aubrecht | 310/12 |
| 4,638,193 | 1/1987 | Jones | 310/15 |
| 4,669,013 | 5/1987 | Scranton et al. | 310/13 |
| 4,704,553 | 11/1987 | Resicow | 310/13 |

FOREIGN PATENT DOCUMENTS

| | | | |
|---|---|---|---|
| 164459 | 7/1986 | Japan | 310/12 |
| 258661 | 11/1986 | Japan | 310/12 |

*Primary Examiner*—Patrick R. Salce
*Assistant Examiner*—D. L. Rebsch
*Attorney, Agent, or Firm*—McCormick, Paulding & Huber

[57] ABSTRACT

An electromagnetic actuator used with a segmented optical element includes a central pole piece that is affixed at one end to the segment, and is movable along a displacement axis. Oppositely wound, longitudinally displaced electical coils on the pole piece are encompassed by an outer magnet. Pole piece displacement is the result of the net axial force generated from the current flowing through the coils.

15 Claims, 1 Drawing Sheet

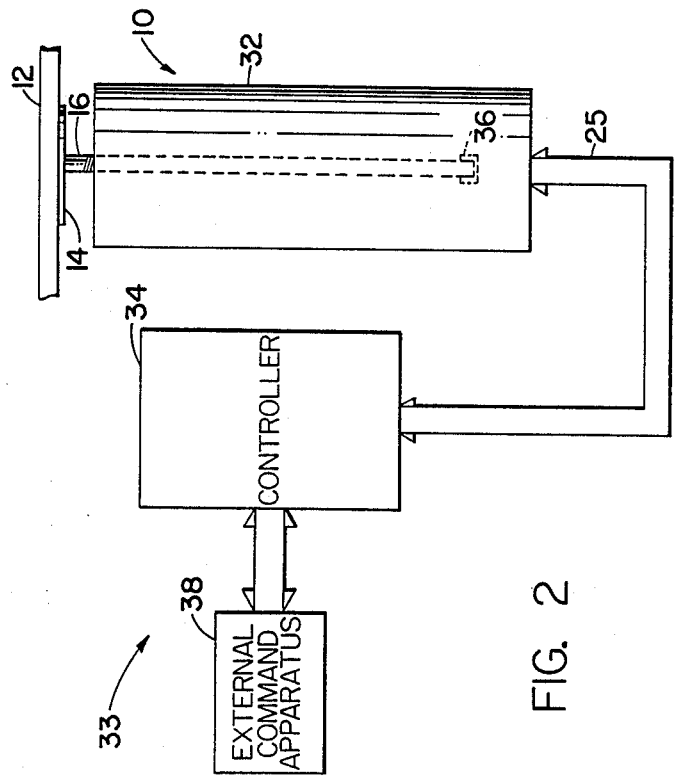
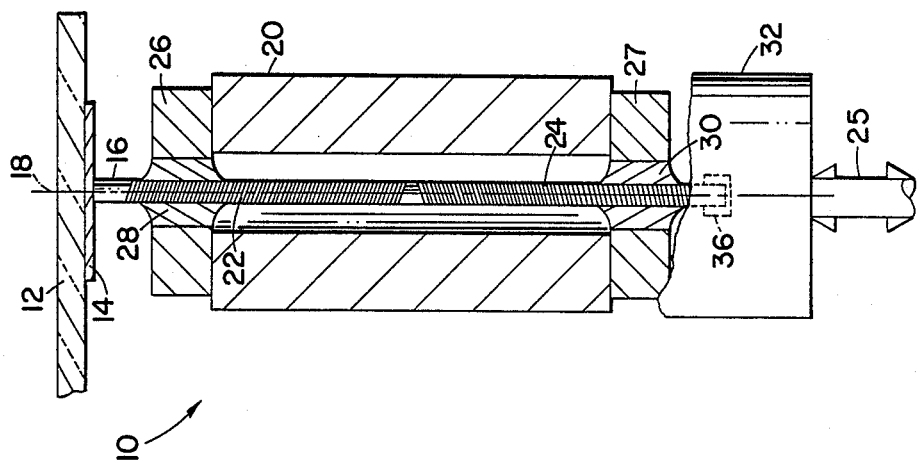

DIFFERENTIALLY WOUND ELECTROMAGNETIC ACTUATOR

TECHNICAL FIELD

This invention relates to electromagnetic actuators and more particularly to electromagnetic actuators having differentially wound coils for use with adaptive optical elements.

BACKGROUND OF THE INVENTION

In the past few years there has been an expanded development of optical systems comprises active or adaptive optical elements which are useful in a variety of civilian and defense applications. These applications include telecommunication systems, very large aperture optical telescopes, and mirrors used for controlled transmission of radiated power. Each of these applications require adaptive or active optical elements which can dynamically compensate for environmentally induced perturbations to either the optical signal or the structure itself. Typically, adaptive optical elements employ a plurality of actuators which deform or otherwise reconfigure an optical surface to alter an incident electromagnetic beam.

For deformable mirrors used in high energy laser (HEL) beam directors, the actuator must provide a substantial amount of displacement force over a relatively short stroke. Consequently, existing actuators for deformable mirrors use piezoelectric or magnetostrictive active elements. Both piezoelectric and magnetostrictive actuators provide accurate displacements essential for precision optics.

Segmented optical elements have also been selected for certain optical applications. As described in the Keck Observatory Report No. 90, published January 1985, the Keck ten meter telescope in Hawaii employs an array of segmented mirrors which together comprise the telescope's primary aperture. In a manner similar to deformable mirrors, segmented optical elements use a plurality of actuators for displacing each segment to align adjacent segment edges, thereby insuring a uniform surface.

The actuators needed for segmented optical elements must provide displacement over a much greater range than actuators used with deformable mirrors, but yet maintain the same high degree of precision. Consequently, existing short stroke, high force piezoelectric or magnetostrictive actuators are unsuitable.

The Keck telescope actuator is a motor driven screw. The actuator can be divided into three major mechanical assemblies that are nested in each other: (1) an outer housing with a counter balance spring, a diaphram, an encoder, drive electronics, and an inner module; (2) an inner precision module with torque motor and limit switch, and (3) an integral bearing roller screw that takes the axial thrust load and converts the rotary torque motor motion into linear displacements. The Keck actuator is optimized to displace large optical segments (approximately 150 kg) in a very slow fashion. The actuator itself weighs approximately 10 kg.

While appropriate for certain telescopic applications, the actuator designs of the prior art which provide both large displacement and precision are too large, too heavy and have insufficient bandwidth for those optical elements comprises large numbers of segments.

SUMMARY OF THE INVENTION

An object of the present invention is to provide an actuator system for use with active optical elements and characterized by a differential-type electromagnetic displacement.

According to the present invention, an actuator for use with an active optical element and which displaces a load, such as a mirror segment, includes an elongated central pole piece adapted to receive the load at an end thereof and movable along a longitudinal displacement axis. A magnet encloses the pole piece partially along its length and provides an axial reference magnetic flux. Also included are first and second electrical windings (coils) wound about the central pole piece, with the first coil wound in a first direction, and the second coil longitudinally displaced from the first coil and wound in an opposite direction. A controller provides an excitation signal to both the first and second windings to generate corresponding electromotive forces, thereby displacing the pole piece as a function of the excitation signal.

BRIEF DESCRIPTION OF THE DRAWINGS

FIG. 1 is a schematic illustration partially in section of an actuator embodying the present invention.

FIG. 2 is a simplified block diagram of an actuator system provided according to the present invention.

BRIEF DESCRIPTION OF THE PREFERRED EMBODIMENTS

Referring now to FIG. 1 there is shown a schematic illustration partially in section of an actuator embodying the present invention used to displace a segment of an adaptive optical element such as is described and claimed in the copending commonly owned U.S. patent application No. 114,540, now a U.S. patent, entitled "Extendable Large Aperture Phased Array Mirror", and incorporated herein by reference. The actuator 10 is positioned to abut a load 12, usually a mirror segment, at an interface plate 14. The actuator includes a central pole piece 16 which is longitudinally disposed along a displacement axis 18. Also included is a means for providing an axial reference magnetic flux, such as a permanent magnet 20.

A first electrical winding 22 is disposed on the central pole piece 16 wound in a first direction, while a second electrical winding 24 is wound about the central pole piece in an opposite direction, and is displaced from the first winding. In the preferred embodiment, the pole piece comprises vanadium, and the permanent magnet comprises a NdFeB alloy. The opposed windings (coils) 22 and 24 are wound from No. 40 AWG wire. As detailed hereinafter with respect to FIG. 2, when excitation current signals are provided on line 25 to the first and second windings, the magnetic interaction between the magnetic flux created by the permanent magnet and the varying currents within the first and second coils produce a displacement of the central pole piece, and ultimately the load, in a precise and reproducable manner.

Additionally, the actuator of FIG. 1 provides a low magnetic reluctance return path for the magnetic fluxes created by the energized windings and the permanent magnet which greatly enhances the displacement efficiency of the actuator. The low magnetic reluctance return path is created by vanadium end caps 26, and 27, and ferrofluidic couplings 28 and 30. The ferrofluidic coupling additionally acts as a seal against dirt and moisture. The body of the actuator, including the magnet 20 and end caps 26 and 27, is located in a housing 32 and is secured to a backing plate at either end of the pole piece (not shown) or other supporting mechanism (not shown). A flexure or bushing centers the pole piece within the annulus of the end caps 26 and 27.

FIG. 2 is a simplified block diagram of an actuator system provided according to the present invention. In this illustrated embodiment the actuator of FIG. 1 is used as part of the actuator system 33 of a large aperture segmented optical element, such as the extended aperture phased array mirror disclosed in the U.S. patent application referred to hereinabove. Actuator system 33 includes a controller 34 including a microprocessor and such memory, signal converters (i.e. A/D and D/A converters) as required for application with the optical element.

Conventional voice coil actuators use a single coil wound on a tubular bobbin which is positioned within an air gap surrounding a central stationary pole piece and enclosed by a surrounding stationary pole piece. This arrangement is well known to those skilled in the art. It is also well known that conventional voice coil actuators require a dimensional clearance on the inner and outer surfaces of the voice coil and tubular bobbin assembly, where said clearance is necessary for free motion of the assembly. For applications which require very small size and high efficiency such as those described hereinabove, this clearance dimension becomes large proportionately to the overall dimensions of the actuator. This has the undesirable effect of reducing the peak force attainable as well as the net efficiency, to the point where such an actuator becomes effectively useless.

It is the distinct advantage of the present invention that for small actuator designs, the required air gap can be reduced to that minimum amount required to allow free motion of the central pole piece within the magnet structure. It is a further advantage of this invention that the simplicity of the individual piece parts results in lower manufacturing costs.

For applications wherein an adaptive optical element must direct high energy laser beams and provide dynamic compensation for optical phase degradation, the performance of existing screw type or single coil actuators is unacceptable. Segmented optical elements require individual segment actuators capable of moving the segments up to one hundred microns with an accuracy of twenty nanometers at displacement rates in excess of one kilohertz. In addition, since many of these optical elements employ thousands of segments, the actuators must be small enough to allow for three, or some other plurality of actuators per segment and operate with low voltages and currents.

The actuator generates very linear and precise control of the absolute segment position using excitation signals of varying magnitudes and polarity. As described hereinabove, the preferred actuator comprises a pair of coils oppositely wound and longitudinally displaced on the center pole piece which allows the pole piece to displace in a "push-push" manner. The coils are formed using a single filament by a winder first in one direction and then reversing the direction of the winding to form the other coil on the opposite half of the pole piece. The controller includes a single amplifier to induce current to flow through both portions of the coil and in series which produced a "push-push" rather than a "push-pull"; on the pole piece. By arranging the coils in this manner the actuator efficiency is high and manufacturing costs are reduced.

Alternatively, it is possible to configure the coils in a "differential" or "push-pull" manner somewhat analogous to a conventional differential screw. A differential screw is a compound screw having an inner element oppositely threaded to an outer element. The displacement of the screw results from the net displacement of the two elements. Similarly, the displacement of the actuator embodying the present invention would result from the net of axial forces applied to the pole piece as a result of current signals applied to each of the coil. Plus and minus displacement of the pole piece along the displacement axis is proportional to the difference in current magnitude between the excitation signals provided to each of the opposed windings.

Compared with presently available high performance voice coils which can be used for high precision mirror positionings, an actuator provided by the present invention has twice the force constant at less than one-fourth the mass and size and at less than five percent of the cost. Parameters for a preferred embodiment of an actuator provided by the present invention are summarized hereinbelow.

Force Constant—0.97 Newtons/Amp
Maximum Current—1.8 Amp
Stroke—100 $\mu$m
Coil Resistance @20° C.—5.8 ohms or
Coil Inductance—140 H
Mass of Coils (40AWG wire)—0.08 g
Mass of Vanadium Pole Piece—0.27 g
Mass of NdFeB Magnet—0.72 g
Mass of Vanadium and Pieces—0.86 g
Mass of Aluminum Sleeve—0.02 g In the preferred embodiment, the controller receives feedback signals from a feedback sensor 36 which comprises any conventional transducer for sensing pole piece displacement. These signals are indicative of the actual displacement of the central pole piece. As shown in the illustrated embodiment of FIG. 2, the controller 34 receives external signals from an external command apparatus 38 not part of the present invention. Typically, this command apparatus coordinates the displacements of a large array of actuators identical to the Actuator 10 either to compensate for distortion in the mirror or to approximate the conjugate shape of wavefront distortions introduced by the atmosphere.

Similarly, although the invention has been described hereinabove with respect to a preferred embodiment those skilled in the art will note that certain additions, deletions and substitutions thereto can be made without departing from the spirit and scope of the invention.

We claim:

1. An actuator system for use with an active optical element to selectively displace a load, said actuator system comprising:
    an elongated central pole piece having opposite ends, adapted to receive a load at one of said ends and movable along a displacement axis extending longitudinally thereof;
    a magnetic means surrounding a portion of the length of said pole piece for providing a reference magnetic flux thereabout;
    a first electrical winding means disposed on said central pole piece and wound in a first direction;
    a second electrical winding means disposed on said central pole piece, said second winding means being longitudinally displaced from said first electrical winding means and being wound in the opposite direction; and a control means for providing excitation signals to said first and second winding means, said first and second excitation signals generating corresponding electromotive forces tending to displace said pole piece as a function of said excitation signals.

2. The actuator system of claim 1 wherein said control means includes sensor means for providing feedback signals indicative of a measured pole piece position along said displacement axis.

3. The actuator system of claim 1 wherein said magnetic means comprises a single permanent magnet.

4. The actuator system of claim 1 wherein said coils are continuously wound in series.

5. The actuator system of claim 1 further comprising magnetic flux return means encompassing said central pole piece and abutting said reference magnet means for providing a low reluctance magnetic return path for said magnetic fluxes.

6. The actuator system of claim 5 wherein said magnetic flux return means comprises ferrofluidic couplings disposed about said pole piece at opposed ends of said reference magnet means.

7. The actuator of claim 5 wherein said central pole piece and said magnetic flux return means comprises end caps.

8. The actuator system of claim 7 wherein said end caps comprise vanadium.

9. The actuator of claim 7 wherein said permanent magnet comprises a NdFeB alloy.

10. An actuator for use with an active optical element in displacing a load, said actuator comprising:

a central pole piece adapted to receive the load at an end thereof and movable along a longitudinal displacement axis;

a magnetic means partially enclosing said pole piece for providing an axial reference magnetic flux thereabout;

a first electrical winding means disposed on said central pole piece in a first direction;

a second electrical winding means disposed on said central pole piece, longitudinally displaced from and in a direction opposite to said first electrical winding means;

said first and second electrical winding means adapted to receive excitation signals generating electromotive forces the sum of which is along the axis of said pole piece so as to displace said pole piece at a selected position along said displacement axis as a function of said excitation signals.

11. The actuator of claim 10 wherein said excitation signals have the same polarity.

12. The actuator of claim 10 wherein said coils are continuously wound in series.

13. The actuator of claim 10 wherein said magnetic means comprises a single permanent magnet.

14. The actuator system of claim 1 further comprising an air gap only on an exterior surface of said windings.

15. The actuator of claim 10 further comprising an air gap only on an exterior surface of said windings.

* * * * *

UNITED STATES PATENT AND TRADEMARK OFFICE
CERTIFICATE OF CORRECTION

PATENT NO. : 4,831,291
DATED : May 16, 1989
INVENTOR(S) : Gregory H. Ames

It is certified that error appears in the above-identified patent and that said Letters Patent is hereby corrected as shown below:

Column 1

Line 14, delete "comprises" and substitute --comprising--.

Line 68, delete "comprises" and substitute --having--.

Column 2

Line 29, please delete "BRIEF DESCRIPTION OF THE PREFERRED EMBODIMENTS" and substitute --DESCRIPTION OF THE PREFERRED EMBODIMENT--.

Line 31, after "1" insert --,--.

Line 35, delete "copending" and substitute --co-pending--.

Line 66, after "26" delete --,--.

Column 4

Line 12, delete "coil" and substitute --coils--.

Lines 44 and 45, delete "Actuators" and substitute --actuators--.

UNITED STATES PATENT AND TRADEMARK OFFICE
CERTIFICATE OF CORRECTION

PATENT NO. : 4,831,291
DATED : May 16, 1989
INVENTOR(S) : Gregory H. Ames

It is certified that error appears in the above-identified patent and that said Letters Patent is hereby corrected as shown below:

Column 6

Line 14, after ";" insert--and--.

In the Abstract

Line 6, delete "electical" and substitute--electrical--.

Signed and Sealed this

Thirtieth Day of January, 1990

Attest:

JEFFREY M. SAMUELS

*Attesting Officer*      *Acting Commissioner of Patents and Trademarks*